United States Patent [19]

Kyrias

[11] 4,287,883
[45] Sep. 8, 1981

[54] COST-EFFECTIVE SOLAR HEATING SYSTEM

[76] Inventor: George M. Kyrias, 31112 Via Santo Tomas, San Juan Capistrano, Calif. 92675

[21] Appl. No.: 147,206
[22] Filed: May 6, 1980
[51] Int. Cl.³ .............................. F24J 3/02; F28F 3/14
[52] U.S. Cl. .................................... 126/445; 126/448; 126/901; 165/159; 165/170
[58] Field of Search ............... 126/444, 445, 448, 901; 165/170, 174, 159

[56] References Cited

U.S. PATENT DOCUMENTS

| 3,076,450 | 2/1963 | Gough | 126/444 |
|---|---|---|---|
| 3,239,000 | 3/1966 | Meagher | 126/448 |
| 3,868,945 | 3/1975 | Konopka et al. | 126/448 |
| 3,934,323 | 1/1976 | Ford et al. | 126/448 |
| 4,023,556 | 5/1977 | Sarazin | 126/448 |
| 4,038,970 | 8/1977 | D'Ascoli et al. | 126/448 |
| 4,082,082 | 4/1978 | Harvey | 126/448 |
| 4,098,331 | 7/1978 | Ford et al. | 126/448 |
| 4,114,597 | 9/1978 | Erb | 126/448 |
| 4,120,286 | 10/1978 | Farber | 126/448 |
| 4,122,239 | 10/1978 | Riboulet et al. | 126/901 |
| 4,150,191 | 4/1979 | Karki | 126/901 |
| 4,154,220 | 5/1979 | Loth | 126/901 |
| 4,159,709 | 7/1979 | Palazzetti | 165/170 |
| 4,167,935 | 9/1979 | Severson | 126/450 |
| 4,211,210 | 7/1980 | Muenker et al. | 126/901 |
| 4,222,373 | 9/1980 | Davis | 126/448 |

Primary Examiner—Daniel J. O'Connor
Attorney, Agent, or Firm—Daniel C. McKown

[57] ABSTRACT

The collector includes two planar panels separated by a thin spacer. The spacer includes a closed border within the edge of the collector and a number of separate strips within the border. The strips are disposed parallel to each other and are spaced in from the border, the spaces between the border and adjacent ends of successive strips alternating between a larger space and a smaller space, so that the path of least resistance through the collector is a serpentine passage. The smaller spaces prevent air and water from being trapped when the panel is filled and drained. A flow-restricting orifice is coupled to each collector to permit the collectors to be supplied at high pressure but without excessive flow. The supply pressure is much greater than the hydrostatic pressure head differences between the collectors so that when the collectors are connected in parallel in an open system, differences in flow rate due to elevation differences between the panels are minimized. The panels used in the collector are composed of glass cloth included in a cured polyester resin or epoxy resin. The strips and border of the separator are composed of a polyester resin or epoxy resin filled with silica particles and applied to the panels through a template.

10 Claims, 16 Drawing Figures

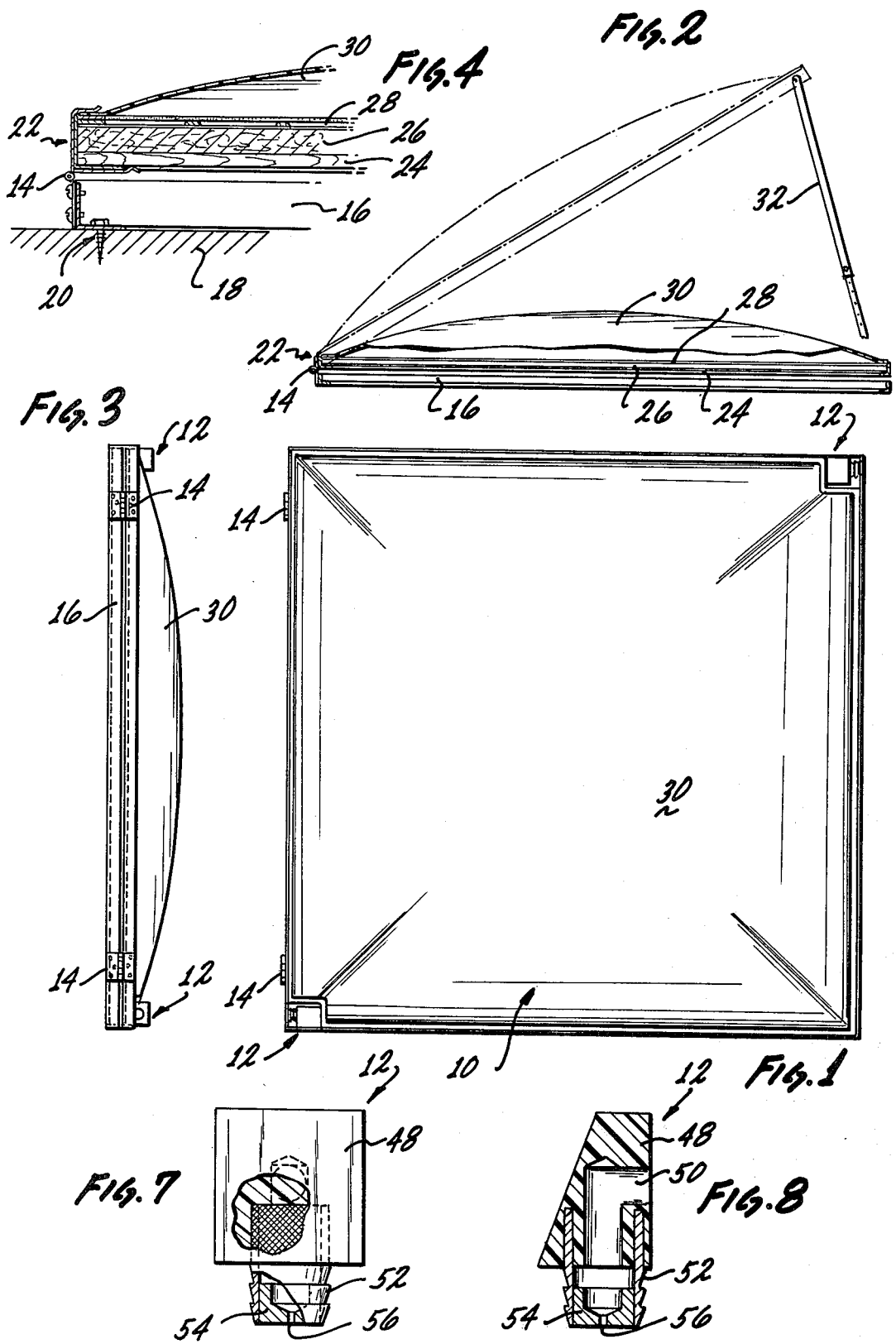

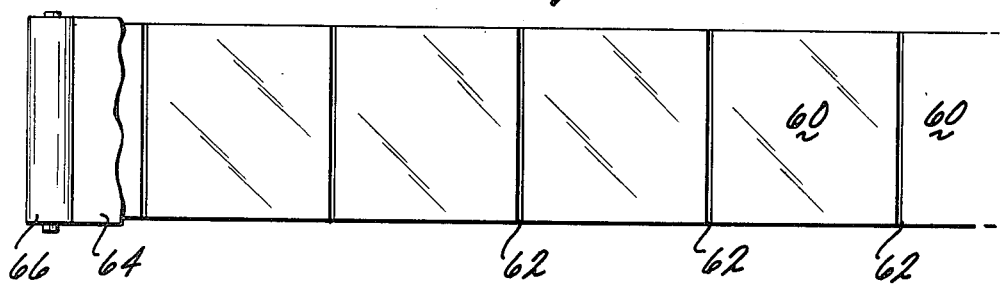
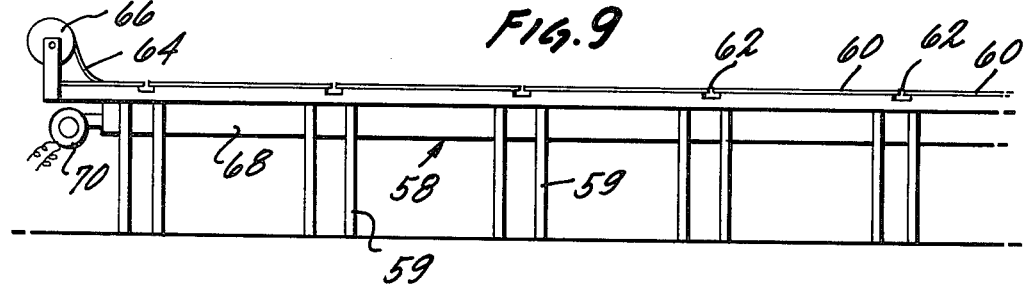
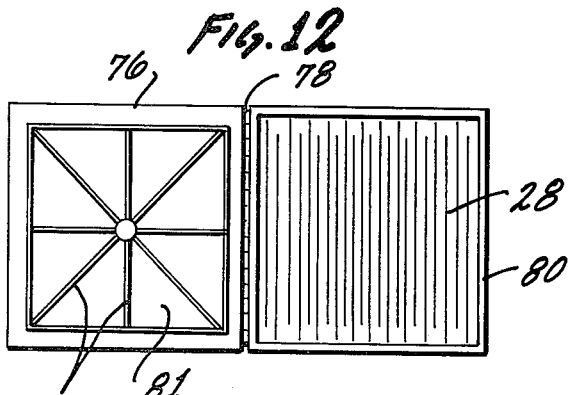
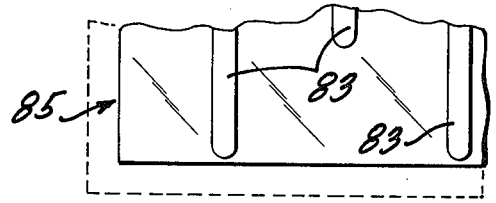
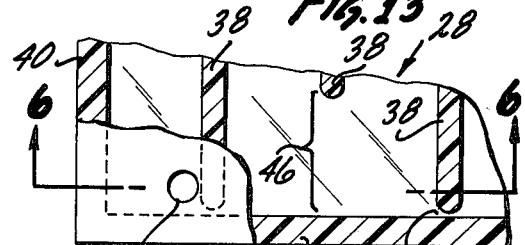
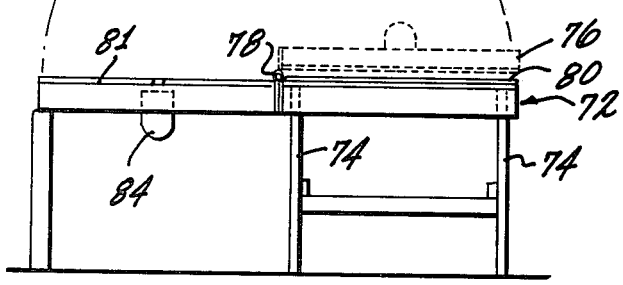
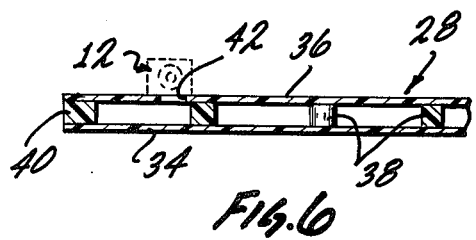

COST-EFFECTIVE SOLAR HEATING SYSTEM

BACKGROUND OF THE INVENTION

1. Field of the Invention

The present invention is in the field of solar heating, and more particularly relates to a low cost apparatus for collecting solar energy and using it to heat a fluid.

2. The Prior Art

An extended discussion of the prior art and several known prior art patents is given in a Prior Art Statement lodged in the Patent Office file relating to the present invention.

The heart of a solar heating system is the collector. The type of collector used in the present invention is a panel through which a fluid (liquid or gas) is forced to flow, to absorb and carry away the heat collected by the panel. Numerous designs for such collector panels have been proposed in recent years.

In spite of the considerable activity in this field, panels currently being marketed are not sufficiently hardy to endure the severe environment to which they are exposed, without excessive maintenance or replacement. Additionally, previous attempts to produce more durable panels have resulted in panels which are even more expensive.

The rigors of the environment should not be underestimated. These include temperatures ranging from below freezing to above 200° C., prolonged exposure to the ultraviolet components of the solar radiation, and exposure to destructive chemicals in the fluid used. Few materials can withstand these stresses daily without experiencing a seemingly premature deterioration.

For example, many materials lose strength and rigidity at the higher temperatures, and the panel structures may become distorted by differential effects. Prolonged exposure to ultraviolet radiation causes many plastic materials to craze and crack. Undesirable chemicals in the fluid may, in time, cause erosion or clogging of the fluid passages.

SUMMARY OF THE INVENTION

In the present invention, these problems are solved, not by the use of more expensive remedies, but by the discovery that a particular material is outstandingly advantageous for use in solar panels, resulting in a panel of superior durability that costs about one-tenth as much to produce as typical panels now on the market.

Finding the right material was only the first step; a procedure had to be developed to construct the solar panels from this material. The procedure had to be practical and economical as well as accurate and dependable.

The structural configuration of the solar panel of the present invention facilitates fabrication of the panel, and test results indicate that the thermal efficiency compares favorably with that of the best panels now on the market.

In the fuller discussion below it will be shown that the solar panel can be used advantageously in a system for heating water. This system includes a number of unconventional aspects that render it very desirable for domestic use.

Other advantages of the present invention will be elucidated in the detailed description below which is illustrated by the following drawings that show an exemplary embodiment of the invention.

BRIEF DESCRIPTION OF THE DRAWINGS

FIG. 1 is a plan view of a solar panel in a preferred embodiment of the invention;

FIG. 2 is a side elevation view of the solar panel of FIG. 1;

FIG. 3 is an end elevation view of the solar panel of FIG. 1;

FIG. 4 is an enlarged fraction of the end elevation view of FIG. 3;

FIG. 5 is a fractional plan view of the collector in a preferred embodiment;

FIG. 6 is a fractional cross sectional view of the collector of FIG. 5;

FIG. 7 is a plan view of a connector fitting used in a preferred embodiment;

FIG. 8 is a side cross sectional view of the connector fitting of FIG. 7;

FIG. 9 is a side elevation view of a processing table used in fabricating the collector in a preferred embodiment;

FIG. 10 is a plan view of the processing table of FIG. 9;

FIG. 11 is a side elevation view of an assembly table used in fabricating the collector in a preferred embodiment;

FIG. 12 is a plan view of the assembly table of FIG. 11;

FIG. 13 is a plan view of a template used in fabricating the collector in a preferred embodiment;

DETAILED DESCRIPTION OF THE PREFERRED EMBODIMENT

Figure 14:
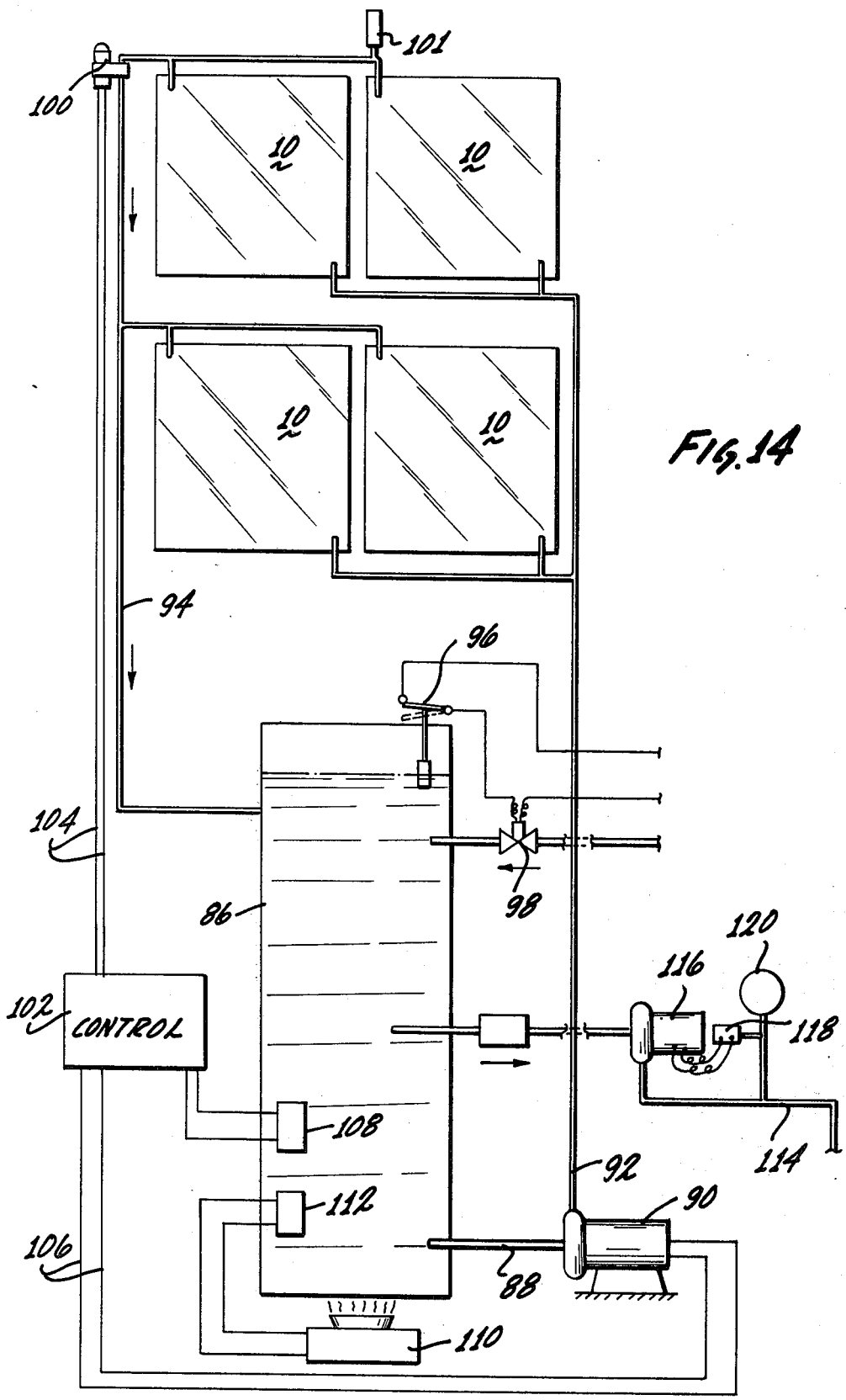
FIG. 14 is a diagram of a system employing the solar panels of the present invention to heat water for domestic use.

Turning now to the drawings, in which like parts are denoted by the same reference numeral, there are shown in FIGS. 1-4 various views of a solar panel 10 in accordance with a preferred embodiment of the present invention. Inlet/outlet fittings 12 (shown in greater detail in FIGS. 7 and 8) are located at diagonally-opposite corners of the solar panel 10 to provide connections for fluid conduits.

In a preferred embodiment, the solar panel 10 is hinged to a frame 16 which typically is affixed to the roof 18 of a building by fasteners 20. When the solar panel 10 is hinged to a frame 16, the solar panel can be tilted to an angle to maximize the collection of heat. This is important in situations where the roof 18 faces north; but where the roof faces south, the frame 16 and hinges 14 may be eliminated and the solar panel 10 may be affixed directly to the roof 18. The solar panel 10 is held at the desire angle of tilt by the brace 32.

As best seen in FIG. 4, the hinged solar panel 10 includes a base 24 of a stiff material such as plywood; an insulative panel or layer 26 such as stiff foamed plastic; the collector 28, which is an assembly best seen in FIGS. 5 and 6; and, a transparent cover or glaze 30. these elements 24, 26, 28, 30 are held together by spring clips 22 in a preferred embodiment, although in other embodiments the elements may be bonded or otherwise fastened together. The transparent cover 30 may consist of glass, acrylic, thin fiberglass, polycarbonate, or any clear material that will pass sunlight. In a preferred embodiment, the transparent cover 30 is sealed to the collector 28 with weather stripping or other sealant.

The transparent cover 30 reduces heat loss to the air, and thereby increases the heat-collecting ability of the solar panel. However, the solar panel is so effective in collecting heat that in many applications the transparent cover 30 may be dispensed with, thereby reducing the cost of the system. Typical of such applications are the heating of a swimming pool and most other uses where the solar panel is mounted to face south.

As best seen in FIGS. 5 and 6, the collector 28 includes a first panel 34 and a second panel 36. The second panel 36 is congruent with the first panel 34 but is spaced from it by a spacer. The spacer includes a border 40 that lies adjacent the periphery of the panels 34, 36, and also includes a number of strips 38.

In a preferred embodiment the strips 38 are spaced from each other and from the border 40. In this embodiment the space between the ends of successive strips 38 and the border 40 alternates between a smaller space 44 and a larger space 46. Further, each strip 38 has a larger space at one end and has a smaller space at its opposite end. Thus, the strips define within the collector 28 a major flow path having a serpentine shape, and a minor flow path adjacent the border 40 through the smaller spaces 44.

The major path is the path of least resistance through the collector, and practically all of the fluid follows the major flow path passing in alternate directions through the channels between the strips in series. In a preferred embodiment the cross section of the major flow path measures approximately 45 millimeters wide by 3.2 millimeters deep, and in general the width should exceed the depth by a factor of at least 10.

The minor flow path is limited by the smaller spaces 44. It serves to expedite drainage of the panel and to prevent air from being trapped in the collector. If it were not for the existence of the smaller spaces, orientation of the collector in use would be extremely critical to prevent trapping of liquid and air.

An inlet/outlet fitting 12 is shown in FIG. 6 as it would be affixed to the collector. FIGS. 7 and 8 show the inlet/outlet fitting in greater detail.

The inlet/outlet fitting 12 includes a body 48, through which a passage 50 extends. A coupling 52 is affixed to the body 48 to surround one end of the passage 50. An insert 54 provided in the end of the coupling 52 includes an orifice 56.

In a preferred embodiment, the body 48 is molded polyester resin. The body 48 is drilled to produce the duct 50, and the metallic coupling 52 including the insert 54 is then set into the body 48 and bonded there. In the preferred embodiment, the diameter of the orifice 56 is approximately 2.36 millimeters, and in general the cross sectional area of the orifice 56 should not exceed one-tenth the area of the duct 50. At the pressures normally used, the orifice 56 limits the flow of liquid through the collector to a flow rate of approximately 8 liters per minute. The reason for thus intentionally limiting the flow will become apparent below. If the collector is to be used to heat air instead of a liquid, the insert 54 is omitted.

The exposed surface of the first panel 34 of FIG. 6 is painted with a white acrylic lacquer to minimize the loss of radiant heat from that surface. Alternatively, a sheet of aluminum foil may be included between that surface and the insulative panel 26. The exposed surface of the second panel 36 of FIG. 6 faces the sun and therefore is coated with a black acrylic lacquer to maximize the absorption of radiant heat. Acrylic lacquer is used in the preferred embodiment because it bonds to and adheres to the preferred panel material quite well.

The preferred material of which the panels 34, 36 are formed is a composite of glass cloth included in a cured polyester resin. The spacer consists of a cured polyester resin which includes a substantial fraction of a silica filler known as CAB-O-SIL ® and available from the Cabot Corporation of Boston, Massachusetts. In an alternative embodiment an epoxy resin is substituted for the polyester resin.

The use of these materials has been found to be especially advantageous. The resulting collectors 28 are impervious to corrosion and to all of the chemicals encountered in use, highly resistant to moisture and to ultraviolet radiation damage, and suffer no distortion at temperatures below 205° C. It will be recalled that these were described as the principal problems with prior art collectors, and it is particularly fortuitous that the material which simultaneously solves these problems is also very inexpensive. In current 1980 dollars, the cost of the collectors 28 when manufactured in quantities of 100 is approximately $1.00 per square foot, i.e., $16 per 4 ft. by 4 ft. collector including labor. This is drastically cheaper than other collectors now on the market.

To be more specific regarding the chemistry of the materials, the polyester may be produced by mixing approximately one mole of a dibasic organic acid selected from the group consisting of phthalic anhydride, isophthalic acid, adipic acid, and terephthalic acid with approximately one mole of a dibasic unsaturated organic acid selected from the group consisting of maleic anhydride and fumaric anhydride, with approximately two moles of either bis phenol A or a glycol selected from the group consisting of ethylene glycol, propylene glycol, neopentyl glycol, diethylene glycol and dipropylene glycol. This mixture is then polymerized to a low acid number, about 35. This polymer is then mixed with 40% of a monomer selected from the group consisting of styrene, vinyl toluene, methylmethacrylate, and 2 ethyl hexyl acrylate. To this mixture is next added approximately 1% of a peroxide catalyst selected from the group consisting of methyl ethyl ketone peroxide, benzoyl peroxide and di-tertiary butyl peroxide. Crosslinking may then be promoted by application of heat or by the addition of approximately 1% of a promotor selected from the group consisting of cobalt octoate, cobalt naphthenate and dimethyl analine. The compounds recited in each of the above groups may be freely substituted in various portions for one another within the group to produce a suitable polyester resin.

Suitable epoxy resins include all epichlorohydrin/bisphenol A polymers crosslinked with a polyamine, polyamide, urea formaldehyde, melamine formaldehyde, methylated melamine, methylated urea, or multibasic organic acid.

The process by which the collector 28 is fabricated will be discussed next with reference to FIGS. 9-12.

In a preferred embodiment, the panels 34, 36 are formed first by use of the fabrication table 58 shown in FIGS. 9 and 10. The fabrication table stands on legs 59 which maintain the top of the table at a convenient elevation. The table top consists of thin steel sheets 60 which are separated by gaps 62 that are on the order of 2 millimeters wide.

A coating of mold release wax is applied to the tops of the steel sheets 60. Next, a strip 64 of 6 ounce or 10 ounce glass cloth is unwound from the roll 66 and drawn out to lie smoothly on the tops of the steel sheets 60. A catalyzed polyester resin or epoxy resin of the type discussed above is then prepared. Some of the resin is poured onto the glass cloth on each of the steel sheets 60 and the resin is spread over the entire glass cloth by a squeegee. The resin must permeate the entire glass cloth, and there must not be any air pockets between the steel sheets 60 and the glass cloth.

A box 68 extends lengthwise under the table top, and the undersides of the steel sheets 60 are exposed to the inside of the box 68. A hot air blower 70 blows hot air into the box 68 to maintain the steel sheets 60 at a temperature of approximately 37.5° C. to promote curing of the resin.

When the resin has reached the jell state, i.e., when the touch of a finger does not transfer resin to the finger, the strip 64 of resin-permeated glass cloth is cut into the individual panels 34, 36 of FIGS. 5 and 6 by running a cutting blade along the gaps 62. Each panel is then stripped from its steel sheet 60 by use of a stripper knife and while still in the jell state is transferred to an assembly tray 80 with the smooth side of the panel down (facing the assembly tray).

The assembly tray 80 is then placed on top of the assembly table 72 as shown in FIGS. 11 and 12. The assembly table 72 stands on its legs 74 and is designed to receive the assembly tray 80 in exactly the same location each time. The assembly table has a lid 76 which is pivotally mounted to one end of the table top by a hinge 78. The lid 76 is shown in its open position in FIGS. 11 and 12, but the closed position is indicated by dashed lines in FIG. 11.

With the lid 76 in its open position, a second panel, also in the jell state of cure, is laid on the surface 80 of the lid, with the smooth side of the second panel facing the surface 81.

Next the template 85 shown in FIG. 13 is laid over the first panel reposing in the assembly tray 80 at the right side of FIGS. 11 and 12. In a preferred embodiment the surface of the template 85 is coated with a lubricant or other non-stick coating. The template includes a number of elongated holes 83 which are used to define the strips 38 of FIGS. 5 and 6. In a preferred embodiment the template is approximately 2.0 centimeters smaller in length and 2.0 centimeters smaller in width than the panels. The template is carefully positioned on top of the first panel in the assembly tray 80 so that the template 85 is spaced approximately 1.0 centimeter from each edge of the panel.

Next, approximately 3 liters of resin of the type discussed above are drawn into a mixing bucket and approximately 6 ounces of Cab-O-Sil silica filler are added and mixed thoroughly with the resin. Next, 1.0% of methyl ethyl ketone catalyst is added and mixed thoroughly. Because of the filler, the mixture should have the consistency of mashed potatoes; that is, it is workable but will not slump. This mixture is then applied to the top of the template 85 and is worked into the holes 83 with a squeegee to bring it into intimate contact with the first panel 34 to form the strips 38. The mixture is also applied to the panel 34 around the periphery of the template to provide the border 40 of FIGS. 5 and 6. Thereafter, the template 85 is immediately removed.

As best seen in FIGS. 11 and 12, the surface 81 of the lid 76 is interrupted by a network of channels 82. These channels 82 communicate with a vacuum pump 84. At this stage in the fabrication process, the vacuum pump 84 is turned on, and the second panel, that has been carefully positioned on the lid surface 81, is drawn against the surface 81 by the reduced pressure in the channels 82. The vacuum is maintained while the lid 76 is then pivoted to the closed position indicated by the dashed lines in FIG. 11. This operation assures that the second panel will be deposited gently and with uniform pressure onto the deposited strips 38 which are still soft, and it assures that the second panel will be deposited in exact registration with the first panel, which is necessary because any lateral adjustment would distort or destroy the still soft deposited strips 38. The vacuum is then released and the lid 76 is then pivoted to its open position. The newly formed collector is now resting on the assembly tray 80 on the top of the assembly table 72. The assembly tray 80 is now removed from the assembly table 72 to a curing rack, where it must stay for 8 hours before the panel is removed from the assembly tray 80. The assembly table is immediately available for use in assembling other collectors.

After the collector has cured for at least 8 hours, a hole cutter is used to make a 19 millimeter diameter hole 42 at each of two diagonally opposite corners of the collector at the ends of the serpentine path. The surface of the panel 36 is roughed up with sand paper adjacent the holes 42, and the inlet/outlet fittings 12 are bonded in place by a small amount of the resin described above. This bond also is cured for 8 hours.

Thereafter, the exposed surface of the panel 36 is coated with a flat-black acrylic lacquer, the exposed surface of the panel 34 is coated with a white acrylic lacquer, and the collector is then stored for further curing for a period of 7 to 30 days prior to installation. This rather lengthy curing period reduces water absorption by the collector to an insignificant level. The template 85 must be cleaned after each use, and this may limit the rate at which collectors are produced.

In an alternative embodiment, the template is dispensed with, and the filler-loaded resin is applied to the first panel by means of a hand-held applicator, comparable to the manner in which decorative icing is applied to a cake by a confectioner. In this alternative embodiment, guide lines on the assembly tray 80 are visible through the first panel to assist the operator. In still another embodiment intended for use at very high production rates, the strips 38 and borders 40 are applied by a row or rows of stationary dispensers as the panel 34 moves along a conveyor at a steady speed.

Figure 16:
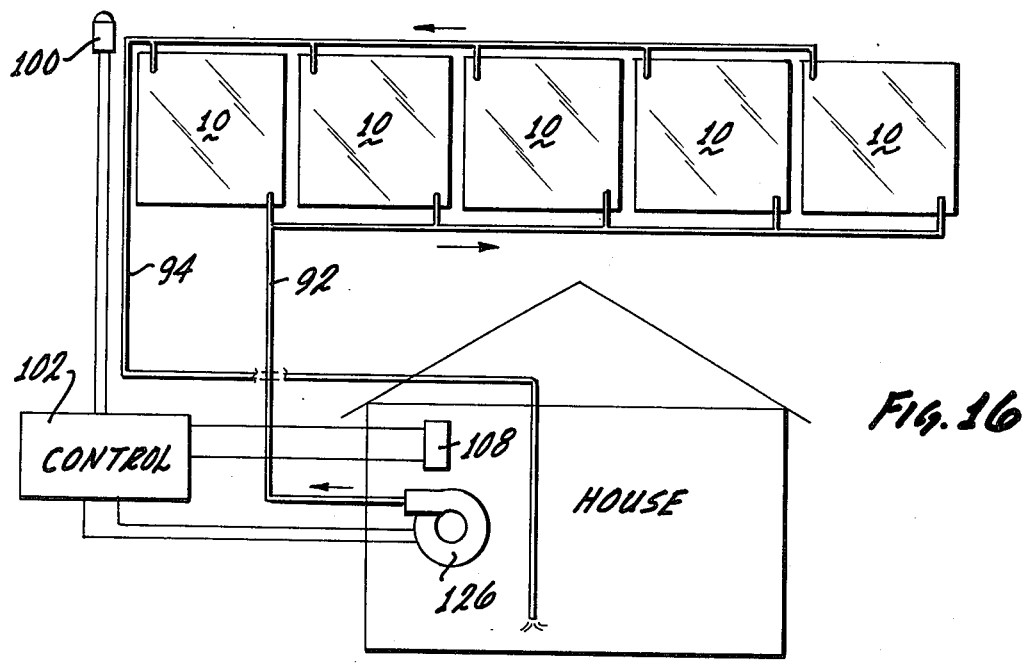
Figure 15:
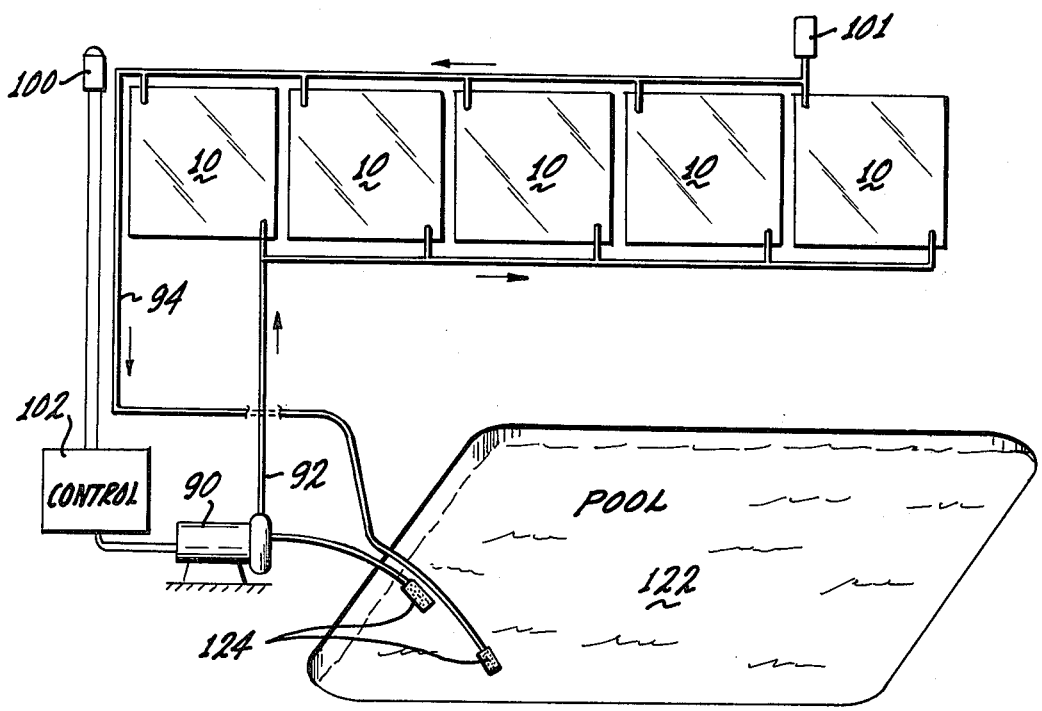
FIG. 15 is a diagram of a system employing the solar panels of the present invention to heat water for a swimming pool; and, FIG. 16 is a diagram of a system employing the solar panels of the present invention to heat air.

The advantages that result from the collector structure described above can best be understood and appreciated by consideration of some systems, shown in FIGS. 14–16, in which the collector is used.

The system shown in FIG. 14 is for use in heating water for a domestic hot water supply. In that system the solar panels 10 are connected in series between a feed pipe 92 and a return pipe 94. The normal flow of water is from the feed pipe 92 into the lower ends of the panels 10 and from the upper ends of the panels 10 to the return pipe 94, and thence to the unpressurized reservoir 86.

When the sun is shining, the arrival of solar radiant energy is sensed by the sensor 100 which is connected by the wires 104 to the controller 102. In a preferred embodiment the sensor 100 is a silicon photocell, although in another embodiment a bolometer exposed to the sun and a bolometer not exposed to the sun may be connected in a bridge circuit. Upon being informed by the sensor 100 that the sun is shining, the controller 102 starts the pump 90 to which it is connected by the wires 106, unless the state of a first thermostat switch 108 indicates that the temperature of the water in the unpressurized reservoir already exceeds a first preset temperature (typically 65° C.).

The pump 90 is connected to the unpressurized reservoir 86 by a supply pipe 88, through which the pump draws the water it supplies to the feed pipe 92.

Initially the solar panels 10 are empty, and as the pump 90 operates, the water level in the solar panels 10 rises. Because the collectors 10 include the smaller spaces 44 of FIG. 5, it is impossible for air to become trapped in the collector as the water level rises. This prevents "water hammer" effects from occurring and assures that all parts of the panel will be used effectively. When the panels have been filled, the water heated by the solar panels flows out of the upper end of each panel to the return pipe 94.

A vacuum valve 101 is installed at the highest elevation in the system. It is a check valve which does not let water out, but which may admit air to the solar panels 10 and to the return pipe 94 to expedite drainage.

When the solar radiation ceases to exceed a preset level, this change is sensed by the solar sensor 100 which sends a signal to the controller 102 via the wires 104. In response, the controller 102 turns off the pump 90. The weight of the water in the panels is no longer supported by the pressure of the pump 90, and so the vacuum valve admits air, which permits the water already in the return pipe 94 to run into the unpressurized reservoir 86, and which permits the water in the solar panels 10 to flow back down through the feed pipe 92, through the pump 90, which in a preferred embodiment is a centrifugal pump, and back through the supply pipe into the unpressurized reservoir 86. Again, the presence of the smaller spaces 44 of FIG. 5 prevents water from being trapped in the panels. Thus, the panels drain completely, preventing the formation of ice within the solar panels 10 which could cause damage or clogging in cold weather.

The water level in the unpressurized reservoir is maintained by a float switch 96 at a particular level. That level is sufficiently far below the top of the unpressurized reservoir 86 that the reservoir can still accommodate the volume of water contained in the solar panels 10, the return pipe 94, and the feed pipe 92. The float switch 96 opens a valve 98 to admit water to the unpressurized reservoir from a source, such as a main. When the water level in the unpressurized reservoir has risen to the preset level, the float switch 96 is tripped, causing the valve 98 to close.

An auxiliary heater 110, operating on electricity or gas, is provided to supply heat to the water in the unpressurized reservoir when the temperature of the water in the unpressurized reservoir falls below a second preset temperature (typically 43.3° C.) as sensed by the second thermostat switch 112. This second temperature is less than the first preset temperature, so that the water in the unpressurized reservoir 86 is maintained at a temperature between the first preset temperature and the second preset temperature, using as much solar energy as possible.

It is noteworthy that the solar panels 10 of the present invention do not have to be disposed at the same elevation. In some solar heating systems, when the panels are connected in parallel in an open system such as the systems of FIGS. 14 and 15, the panels must be maintained at substantially the same elevation to prevent the static hydraulic pressure head from driving a disproportionately large fraction of the water through the lower panels thereby leaving an inadequate flow through the higher panels which are supplied at a reduced pressure.

The key to preventing such an unequal distribution of water among panels disposed at various heights is the orifice 56 of FIGS. 7 and 8. The orifice 56 limits the flow of water through the panels, so that the water can be supplied to the panels at a pressure that in a preferred embodiment is at least five times greater than the maximum difference in hydraulic head between the panels, without occasioning a large flow of water. Accordingly, the hydraulic head variations are only a small fraction of the pressure supplied to each panel.

The orifice 56 is effective in another way to minimize differences in flow rates through panels at various elevations. It is well known in the art that an orifice presents a nonlinear resistance to the flow of liquid. That is, the flow rate through the orifice is not directly proportional to the pressure applied, but instead is proportional to the square root of the pressure drop across the orifice. For example, a 20% variation in pressure will produce a variation in flow rate of only 10%. Thus, in accordance with the present invention, the orifice 56 greatly reduces variations in the flow rate between solar panels connected in parallel but disposed at different elevations.

In an alternative embodiment the orifice is not included in the inlet/outlet fitting, but instead is included in the branch of the feed line 92 that supplies water to the panel; it is essential only that the flow into each panel 10 pass through an orifice located at approximately the same elevation as the panel.

Because the reservoir 86 of FIG. 14 is unpressurized, it can be of a lightweight and less expensive construction than a pressurized reservoir. In a preferred embodiment the reservoir 86 may have a square cross section.

In order to provide pressure to faucets and other fixtures throughout the house, a small pump 116 is connected to draw water from the reservoir 86 through the check valve 87 and to supply the water under pressure to the distribution pipe 114. An accumulator 120 communicates with the distribution pipe 114 to keep it pressurized when the pump 116 is not operating. A pressure switch 118 also is connected into the distribution pipe 114, and when it senses that the pressure has dropped below a preset level it turns on the pump 116 to maintain the pressure.

FIG. 15 shows a system for heating the water in a swimmng pool 122 or spa. It has been found that five solar panels 10 each measuring 1.22 meters by 1.22 meters are adequate to warm an average sized pool. When the solar panels 10 are to be used for heating a swimming pool, the transparent covers 30 are omitted from the solar panels. The ends of the supply tube 88 and the return tube 94 are enclosed by the strainers 124 to prevent debris from being carried into the solar panels 10.

The sensor 100 generates an electrical signal when the solar radiation exeeds some preset level and this signal is applied to the controller 102 to turn on the pump 90. The pump 90 remains on as long as the solar radiation exceeds the preset level. When the solar radiation falls below the preset level, the pump 90 is turned off and the solar panels 10 drain completely.

FIG. 16 shows how the solar panels 10 can be used to heat air. Air from the interior of a house or other building is drawn into the blower 126 which forces the air through the feed pipe 92 and into the solar panels 10. In a preferred embodiment the transparent cover 30 is used only in the colder climates but may be omitted in the warmer climates.

Although the flow of air is not large, the system is very effective because the air is heated to a high temperature. It has been found that when the air is not flowing the temperature inside the solar panel may reach 127° C. with the transparent cover 30 in place, and 69° C. without the transparent cover.

As in the system of FIG. 14, the sensor 100 initiates operation of the blower 126 unless the state of the thermostat switch 108 indicates that the house is already warm enough.

The ease with which the systems of FIGS. 15 and 16 can be installed by the homeowner is noteworthy; no special tools or expertise is required. The mounting frames 16 are attached to the building or other structure, thereby mounting the solar panels 10 where desired. In the best mode, the solar panels would be mounted on a roof or wall that faces south (in the northern hemisphere). Thereafter, a manifold of tubing or pipe is made up on the ground to fit the spacing of the solar panels approximately. The manifold is then carried aloft and the ends of the manifold are slipped over the inlet/outlet fittings 12 of the panels and clamped thereto.

Thus, there has been described a solar energy collector that is drastically cheaper than other collectors now on the market, and which successfully overcomes some of the problems which have plagued other collectors.

Unlike the other collectors, the solar energy collector of the present invention is unaffected by prolonged exposure to the ultraviolet components of direct sunlight. The collector of the present invention is inert to all of the chemicals to which it is exposed in normal use.

Unlike other collectors, the collector of the present invention has a relatively high heat distortion temperature, so that it maintains its shape and strength even when the fluid is not circulating.

These advantages result from the materials used in the collector—glass cloth included in a cured polyester resin or a cured epoxy resin.

The structure of the collector panel assures that it drains completely and rapidly and also assures that air cannot be trapped within the collector. As a result, the collector is not subject to freezing or to "water hammer" effects.

Both the materials used and the process used for fabrication contribute to achieving the low cost of the collector panels, approximately $1.00 per square foot.

The fluid channel in the collector is a single serpentine path, in contrast to the parallel paths found in other collectors. The fluid channel has an unusual cross section, being wider and shallower than in conventional collectors to present the greatest possible area for collection of solar energy. The flow rate is lower than in conventional collectors, and this saves pumping energy.

The flow of liquid through the collector is intentionally restricted by a small orifice. When the collectors are connected in parallel in an open system, the restricted flow assures that variations in the heights of the collectors will only slightly affect the flow rate through the panels so that the flow rates for the various panels will be approximately the same.

Finally, the collectors of the present invention can be readily installed by homeowners; no special skills or special tools are required.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A collector of solar heat comprising in combination:
a first panel of a composite material including a sheet of glass cloth included in a cured polyester resin;
a second panel, parallel to but spaced from said first panel, of a composite material including a sheet of glass cloth included in a cured polyester resin; and,
a spacer of a cured mixture of silica particles and a polyester resin, located between and bonded to said first panel and said second panel, and including strips juxtaposed across the opposing surfaces of said first panel and said second panel, each of said strips being completely surrounded by a space included between said first panel and said second panel, whereby said space constitutes a passage for the flow of a fluid through said collector;
said spacer further comprising a border surrounding a closed area and enclosing said strips, and in which both ends of each of said strips are spaced from said border to expedite drainage and to prevent trapping of air and fluid within the collector, the spaces between said border and adjacent ends of successive strips alternating between a larger space and a smaller space, whereby the path of least resistance through the collector is a serpentine passage.

2. The collector of claim 1 further comprising a fitting affixed to said collector adjacent one end of said serpentine passage and having a duct communicating with said serpentine passage, said fitting including an orifice smaller than said duct to restrict the flow of fluid through said serpentine passage.

3. The collector of solar heat of claim 2 wherein the cross sectional area of said orifice is less than one tenth the cross sectional area of said serpentine passage.

4. The collector of solar heat of claim 1 wherein the width of said passage in a direction parallel to said first panel is at least ten times the spacing between said first panel and said second panel.

5. A collector of solar heat comprising in combination:
a first panel of a composite material including a sheet of glass cloth included in a cured epoxy resin;
a second panel, parallel to but spaced from said first panel, of a composite material including a sheet of glass cloth included in a cured epoxy resin; and,
a spacer of a cured mixture of silica particles and an epoxy resin, located between and bonded to said first panel and said second panel, and including strips juxtaposed across the opposing surfaces of said first panel and said second panel, each of said strips being completely surrounded by a space included between said first panel and said second panel whereby said space constitutes a passage for the flow of a fluid through said collector;
said epoxy resin further comprising:
a polymer of the group consisting of epichlorohydrin and bisphenol A, said polymer being crosslinked with a compound of the group consisting of a polyamine, a polyamide, urea formaldehyde, melamine formaldehyde, methylated melamine, methylated urea, or a multibasic organic acid.

6. A collector of solar heat comprising in combination:

a first panel of a composite material including a sheet of glass cloth included in a cured polyester resin;

a second panel, parallel to but spaced from said first panel, of a composite material including a sheet of glass cloth included in a cured polyester resin; and, a spacer of a cured mixture of silica particles and a polyester resin, located between and bonded to said first panel and said second panel, and including strips juxtaposed across the opposing surfaces of said first panel and said second panel, each of said strips being completely surrounded by a space included between said first panel and said second panel, whereby said space constitutes a passage for the flow of a fluid through said collector;

said polyester resin further comprising:

a dibasic organic acid of the group consisting of phthalic anhydride, isophthalic acid, adipic acid, and terephthalic acid;

an unsaturated dibasic organic acid of the group consisting of maleic anhydride and fumaric anhydride;

a glycol of the group consisting of ethylene glycol, propylene glycol, neopentyl glycol, diethylene glycol, and dipropylene glycol, or bisphenol A;

the above compounds mixed and polymerized to a low acid number and then combined with a monomer of the group consisting of styrene, vinyl toluene, methylmethacrylate, and a ethyl hexyl acrylate; and, a catalyst of the group consisting of MEK peroxide, benzoyl peroxide, and di-tertiary butyl peroxide.

7. A collector of solar heat comprising in combination:

a first panel of a composite material including a sheet of glass cloth included in a cured epoxy resin;

a second panel, parallel to but spaced from said first panel, of a composite material including a sheet of glass cloth included in a cured epoxy resin; and, a spacer of a cured mixture of silica particles and an epoxy resin, located between and bonded to said first panel and said second panel, and including strips juxtaposed across the opposing surfaces of said first panel and said second panel, each of said strips being completely surrounded by a space included between said first panel and said second panel whereby said space constitutes a passage for the flow of a fluid through said collector;

said spacer further comprising a border surrounding a closed area and enclosing said strips, and in which both ends of each of said strips are spaced from said border to expedite drainage and to prevent trapping of air and fluid within the collector, the spaces between said border and adjacent ends of successive strips alternating between a larger space and a smaller space, whereby the path of least resistance through the collector is a serpentine passage.

8. The collector of claim 7 further comprising a fitting affixed to said collector adjacent one end of said serpentine passage and having a duct communicating with said serpentine passage, said fitting including an orifice smaller than said duct to restrict the flow of fluid through said serpentine passage.

9. The collector of solar heat of claim 8 wherein the cross sectional area of said orifice is less than one tenth the cross sectional area of said serpentine passage.

10. The collector of solar heat of claim 7 wherein the width of said passage in a direction parallel to said first panel is at least ten times the spacing between said first panel and said second panel.

* * * * *